(12) United States Patent
Garner et al.

(10) Patent No.: US 11,719,440 B2
(45) Date of Patent: Aug. 8, 2023

(54) PRE-SWIRLER HAVING DIMPLES

(71) Applicant: DOOSAN ENERBILITY CO., LTD., Changwon-si (KR)

(72) Inventors: Chad Garner, Jupiter, FL (US); Andres Jaramillo, Jupiter, FL (US)

(73) Assignee: DOOSAN ENERBILITY CO., LTD., Changwon (KR)

( * ) Notice: Subject to any disclaimer, the term of this patent is extended or adjusted under 35 U.S.C. 154(b) by 621 days.

(21) Appl. No.: 16/225,799

(22) Filed: Dec. 19, 2018

(65) Prior Publication Data
US 2020/0200388 A1 Jun. 25, 2020

(51) Int. Cl.
*F23R 3/14* (2006.01)

(52) U.S. Cl.
CPC ..................... *F23R 3/14* (2013.01)

(58) Field of Classification Search
CPC .......... F23R 3/14; F23R 3/16; F05D 2260/14; F05D 2250/80; F01D 5/145; F01D 5/143
USPC ....................................................... 415/208.1
See application file for complete search history.

(56) References Cited

U.S. PATENT DOCUMENTS

| | | | | | |
|---|---|---|---|---|---|
| 4,720,239 | A | * | 1/1988 | Owczarek | F01D 5/16 415/181 |
| 5,609,470 | A | * | 3/1997 | Dodd | F01D 5/286 416/192 |
| 6,162,136 | A | * | 12/2000 | Aoyama | A63B 37/0004 473/383 |
| 6,183,197 | B1 | * | 2/2001 | Bunker | F01D 5/141 416/95 |
| 6,538,887 | B2 | * | 3/2003 | Belady | F04D 29/38 361/695 |
| 6,539,627 | B2 | * | 4/2003 | Fleck | F01D 5/187 29/889.7 |
| 8,511,092 | B2 | | 8/2013 | Uhm et al. | |
| 8,905,704 | B2 | * | 12/2014 | Sauer | F03D 3/065 415/4.2 |
| 8,926,267 | B2 | * | 1/2015 | Lee | F01D 5/082 415/115 |
| 8,961,135 | B2 | * | 2/2015 | Beeck | F01D 5/22 416/97 R |

(Continued)

FOREIGN PATENT DOCUMENTS

KR 10-1530354 B1 6/2015

OTHER PUBLICATIONS

Terekhov, V., & Mshvidobadze, Y. (2016). Features of heat transfer at interaction of an impact swirl jet with a dimple. Thermal Science, 20(suppl. 1), 35-45. https://doi.org/10.2298/tsci150819137t (Year: 2016).*

(Continued)

*Primary Examiner* — Igor Kershteyn
*Assistant Examiner* — Theodore C Ribadeneyra
(74) *Attorney, Agent, or Firm* — Harvest IP Law LLP

(57) ABSTRACT

A pre-swirler unit can include: a shroud including a bottom surface and a top surface opposite to the bottom surface; a blade disposed on the top surface and including a leading edge and a trailing edge, wherein the blade comprises a concave side surface and a convex side surface that are disposed between the leading edge and the trailing edge, wherein the convex side surface comprises a first plurality of dimples, and wherein the concave side surface comprises a second plurality of dimples.

17 Claims, 4 Drawing Sheets

(56) References Cited

U.S. PATENT DOCUMENTS

| | | | | |
|---|---|---|---|---|
| 8,967,973 B2* | 3/2015 | Ingram | | F01D 5/143 |
| | | | | 416/193 A |
| 9,021,811 B2* | 5/2015 | Lam | | F23C 7/004 |
| | | | | 60/748 |
| 9,360,221 B2* | 6/2016 | Butler | | F23R 3/14 |
| 9,506,362 B2* | 11/2016 | Burdgick | | F01D 9/042 |
| 9,777,712 B2* | 10/2017 | Marquardt | | F03D 1/04 |
| 10,366,904 B2* | 7/2019 | Jaramillo | | H01L 23/5386 |
| 10,539,022 B2* | 1/2020 | Choi | | F01D 11/008 |
| 10,539,157 B2* | 1/2020 | Schilling | | F04D 29/38 |
| 10,677,072 B2* | 6/2020 | Ju | | F01D 5/225 |
| 10,760,421 B2* | 9/2020 | Choi | | F01D 9/04 |
| 10,808,540 B2* | 10/2020 | Eastwood | | F01D 25/24 |
| 10,982,544 B2* | 4/2021 | Nagai | | F01D 1/02 |
| 2004/0213661 A1* | 10/2004 | Sekularac | | F04D 29/30 |
| | | | | 415/1 |
| 2011/0023494 A1* | 2/2011 | Butler | | F23R 3/286 |
| | | | | 60/748 |
| 2011/0299989 A1* | 12/2011 | Richter | | F01D 5/22 |
| | | | | 416/189 |
| 2013/0011265 A1* | 1/2013 | Miller | | F01D 11/008 |
| | | | | 416/191 |
| 2013/0052030 A1* | 2/2013 | McCaffrey | | F01D 9/041 |
| | | | | 416/241 B |
| 2014/0186174 A1* | 7/2014 | Malfa | | F01D 25/24 |
| | | | | 415/220 |
| 2015/0275865 A1* | 10/2015 | Marquardt | | F03D 1/0691 |
| | | | | 415/1 |
| 2016/0010555 A1* | 1/2016 | Suciu | | F01D 9/065 |
| | | | | 60/772 |
| 2016/0319668 A1 | 11/2016 | Paesano et al. | | |
| 2019/0292915 A1* | 9/2019 | Eastwood | | F01D 5/145 |

OTHER PUBLICATIONS

Stolt, A. J., Ullah, A. H., Estevadeordal, J. (2019). Study of leading-edge dimple effects on airfoil flow using tomographic PIV and temperature sensitive paint. Fluids, 4(4), 184. https://doi.org/10.3390/fluids4040184 (Year: 2019).*

Lee, H., Lee, J., Kim, S., Cho, J., Kim, D. (2018). Pre-swirl system design including inlet duct shape by using CFD analysis. vol. 5B: Heat Transfer. https://doi.org/10.1115/gt2018-76323 (Year: 2018).*

Mahamuni, S. s. (Jul. 2015). A Review on Study of Aerodynamic Characteristics of Dimple Effect on Wing. International Journal of Aerospace and Mechanical Engineering. Retrieved Oct. 13, 2021, from https://www.ijamejournals.com/pdf/rpj145046.pdf. (Year: 2015).*

Kim, D., Lee, H., Lee, J., & Cho, J. (2018). Design and validation of a pre-swirl system in the newly developing gas turbine for power generation. vol. 5B: Heat Transfer. https://doi.org/10.1115/gt2018-76255 (Year: 2018).*

* cited by examiner

PRE-SWIRLER HAVING DIMPLES

BACKGROUND OF THE INVENTION

A gas turbine generally comprises a compressor, a combustor, and a turbine. The compressor provides compressed air generated by a plurality of compressor blades to the combustor, wherein the compressed air is high-temperature and high-pressure air. The combustor mixes the compressed air, introduced from the compressor, with fuel and combusts the fuel-air mixture. The combusted gas generated from the combustor is discharged to the turbine and the turbine is rotated by the combusted gas, thereby generating power. The generated power is used in various fields such as for the generation of electricity and for driving machineries. The gas turbine is used to drive a generator, an aircraft, a locomotive, and the like.

The blade or vane of the turbine is exposed to the hot combusted gas; therefore it is necessary to provide the turbine with cooling air in order to cool down the blade. The cooling air can be the compressed air provided by the compressor or the ambient air provided from the outside of the gas turbine. When the cooling air is provided to the turbine, the cooling air should be controlled in order to cool effectively the turbine while do not affect the performance of the turbine. Therefore, a pre-swirler needs to be installed before the turbine to control the cooling air.

The pre-swirler swirls the cooling air circumferentially up to the rotational speed of the corresponding blade of the turbine. However, while the cooling air swirled by the pre-swirler reduces parasitic pumping losses, the swirled cooling air causes the pressure losses.

BRIEF SUMMARY OF THE INVENTION

Embodiments of the subject invention provide novel and advantageous pre-swirlers that comprise a blade including a plurality of dimples formed on a side surface, thereby lowering drag force and improving the flow of the cooling air on the surface.

In an embodiment of the present invention, a pre-swirler unit can comprise: a shroud; a blade disposed on the shroud and including a leading edge and a trailing edge, wherein the blade comprises a concave side surface and a convex side surface that are disposed between the leading edge and the trailing edge, and wherein the convex side surface comprises a first plurality of dimples.

In another embodiment of the present invention, a pre-swirler unit can comprise: a shroud including a bottom surface and a top surface opposite to the bottom surface; a blade disposed on the top surface and including a leading edge and a trailing edge, wherein the blade comprises a concave side surface and a convex side surface that are disposed between the leading edge and the trailing edge, wherein the convex side surface comprises a first plurality of dimples, and wherein the concave side surface comprises a second plurality of dimples.

In yet another embodiment of the present invention, a pre-swirler unit can comprise: a shroud including a bottom surface, a top surface opposite to the bottom surface, and a side surface disposed between the bottom surface and the top surface; a blade disposed on the top surface and including a leading edge, a trailing edge, a concave side surface, and a convex side surface, wherein the concave side surface and a convex side surface are disposed between the leading edge and the trailing edge, wherein the convex side surface comprises a first plurality of dimples, wherein the concave side surface comprises a second plurality of dimples, wherein the side surface of the shroud comprises a first side surface, a second side surface, a third side surface, a fourth side surface, a fifth side surface, a sixth side surface, a seventh side surface, and an eighth side surface, wherein the first side surface corresponds to the concave side surface of the blade and the second side surface corresponds to the convex side surface of the blade, wherein the third side surface, the fourth side surface, and the fifth side surface connect the first side surface to the second side surface while the fifth side surface corresponds to the concave side surface, and wherein the sixth side surface, the seventh side surface, and the eighth side surface connect the first side surface to the second side surface while the eighth side surface corresponds to the convex side surface.

DETAILED DISCLOSURE OF THE INVENTION

Figure 1:
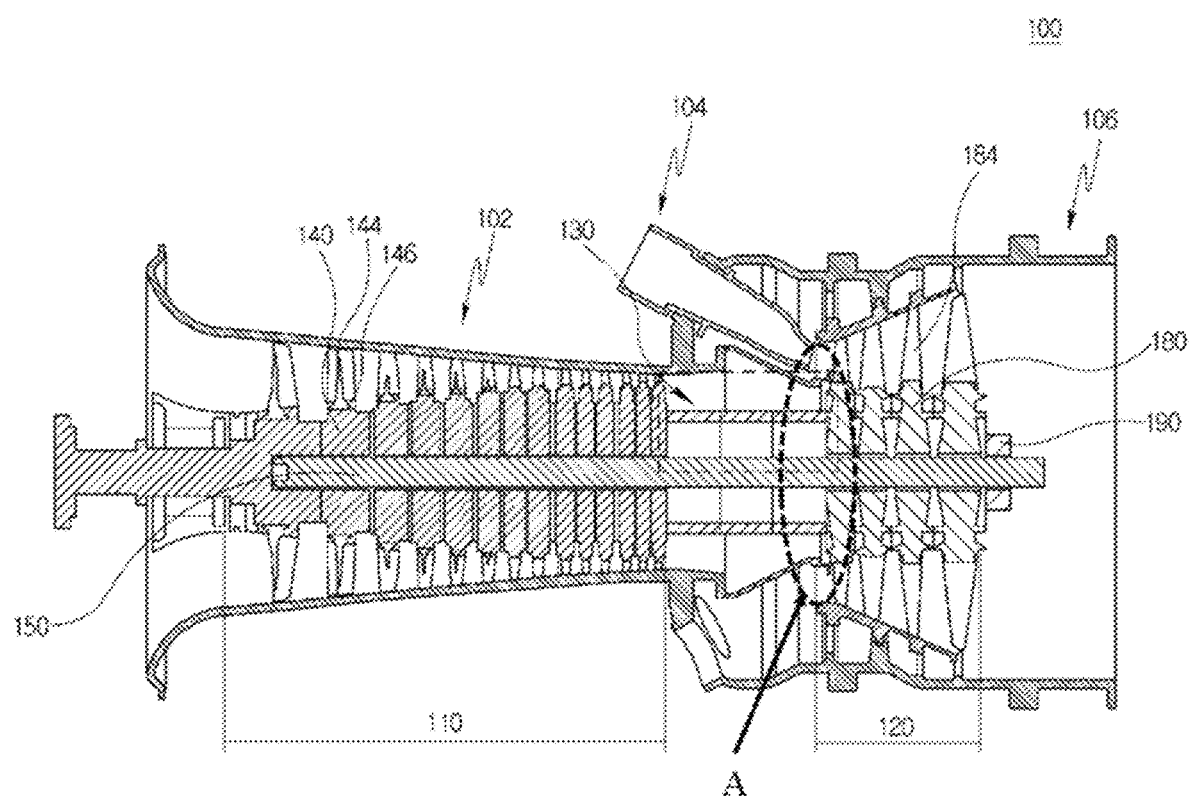
FIG. 1 shows a cross-sectional view of a gas turbine according to an embodiment of the subject invention.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present. The terms "includes" and "including" are equivalent to "comprises" and "comprising", respectively.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated. In addition, the terms "first" and "second" can be selectively or exchangeably used for the members.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, a dimension of each of the elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 2:
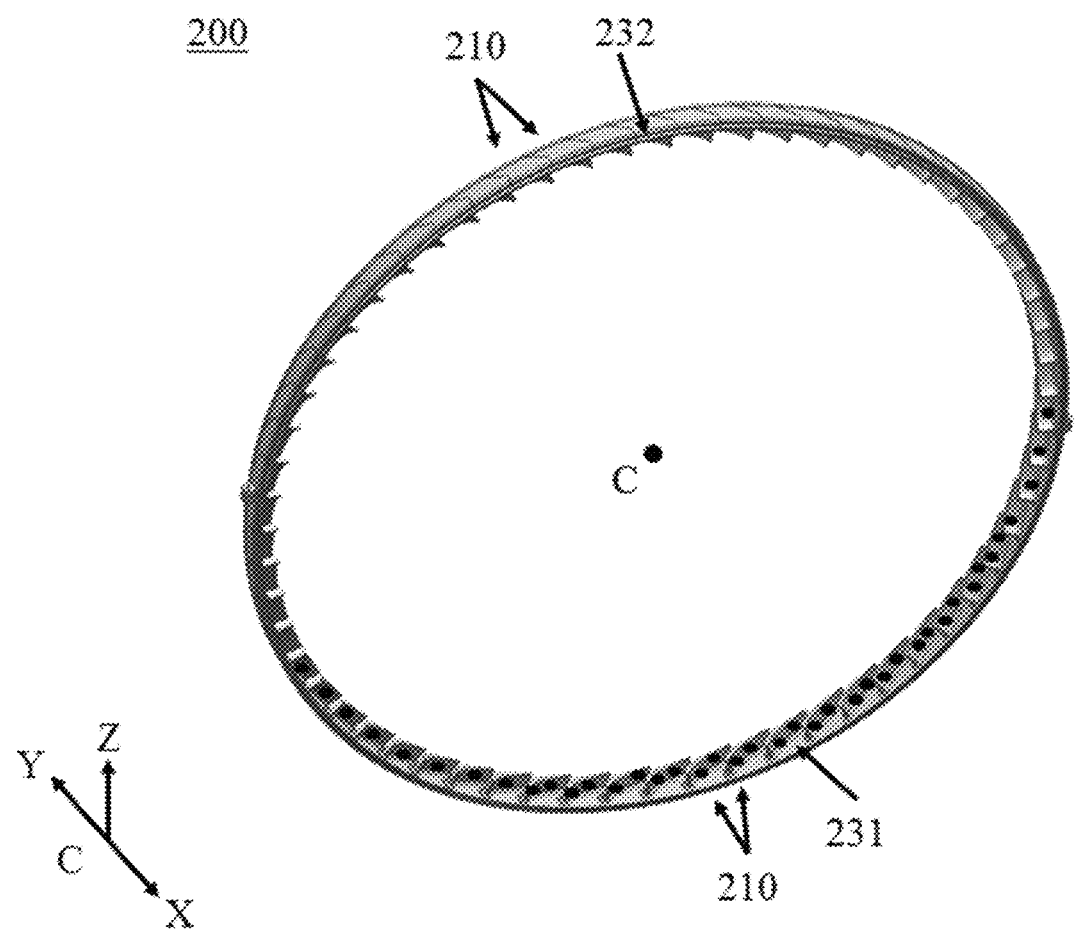
FIG. 2 shows a pre-swirler according to an embodiment of the subject invention.

Reference will be made to the attached figures on which the same reference numerals are used throughout to indicate the same or similar components. FIG. 1 shows a cross-sectional view of a gas turbine according to an embodiment of the present invention, and FIG. 2 shows a pre-swirler according to an embodiment of the subject invention. Referring to FIGS. 1 and 2, the gas turbine 100 according to an embodiment of the present invention comprises a compressor 110, a combustor 104, a turbine 120, a housing 102, and a diffuser 106.

The housing 102 covers the compressor 110, and the compressor 110 provides compressed air to the combustor 104. The combustor 104 generates hot gas using the compressed air and provides the hot gas to the turbine 120. The turbine 120 generates a rotation torque by using the hot gas provided by the combustor 104. The diffuser 106 is placed behind the turbine 120 and broadens the hot gas and reduces its speed. The gas turbine 100 further comprises a torque tube 130 between the compressor 110 and the turbine 120 in order to transfer the rotation torque generated by the turbine 120 to the compressor 110.

The compressor 110 includes a plurality of compressor blades 144, which are arranged on a plurality of compressor rotor disks 140 in a radial fashion. Each of the plurality of compressor blades 144 includes a compressor blade root 146 configured to be coupled with the compressor rotor disk 140 via a dove tail shape or a fir tree shape. The compressor 110 rotates the plurality of compressor blades 144, and air is thus moved while being compressed due to the rotation of the plurality of compressor blades 144. In an embodiment, the compressor 110 may be directly or indirectly connected to the turbine 120 so as to receive some of the power generated by the turbine 120, which is in turn used to rotate the plurality of compressor blades 144.

The air compressed in the compressor 110 is moved to the combustor 104. The combustor 104 includes a plurality of casings and a plurality of burners, which are arranged in a circular pattern. The combustor 104 comprises a combustion chamber defined by a liner, and fuel is provided through a fuel nozzle to the combustion chamber of the combustor 104. The compressed air is mixed with the fuel and then is combusted in the combustion chamber. Subsequently, the combusted hot gas is discharged to the turbine 120 so as to rotate a turbine blade 184 attached on a turbine rotor disk 180.

The gas turbine 100 further comprises a tie bolt 150 that is arranged to pass through the turbine rotor disk 180 and the compressor rotor disk 140. A first distal end of the tie bolt 150 is attached to a first compressor rotor disk of the plurality of compressor rotor disks 140 and a second distal end of the tie bolt 150 is fixed by a fixing nut 190. Facing surfaces of adjacent compressor rotor disks are compressed by the tie bolt 150 such that the adjacent compressor rotor disks do not rotate individually. The gas turbine 100 can comprise a vane attached on the housing 102 and placed between the plurality of compressor rotor disks 140.

The turbine 120 comprises the plurality of turbine rotor disk 180 and the plurality of turbine blades 184 coupled with the turbine rotor disk 180. Similar to the plurality of compressor blades 144, the plurality of turbine blades 184 are arranged on the turbine rotor disk 180 in a radial fashion. In addition, the plurality of turbine blades 184 are assembled to the turbine rotor disk 180 through a dove tail junction or fir tree junction.

The gas turbine 100 further comprises a pre-swirler 200 that is placed in the "A" area of the FIG. 1. The pre-swirler 200 is installed before the turbine 120 relative to a direction of the air flow, more particularly, before the first turbine blade of the plurality of turbine blades 184 such that swirls the compressed air provided by the compressor 110. That is, the pre-swirler 200 is disposed between the compressor 110 and the turbine 120, and the pre-swirler 200 provides the turbine 120 with the swirled compressed air.

Figure 3:
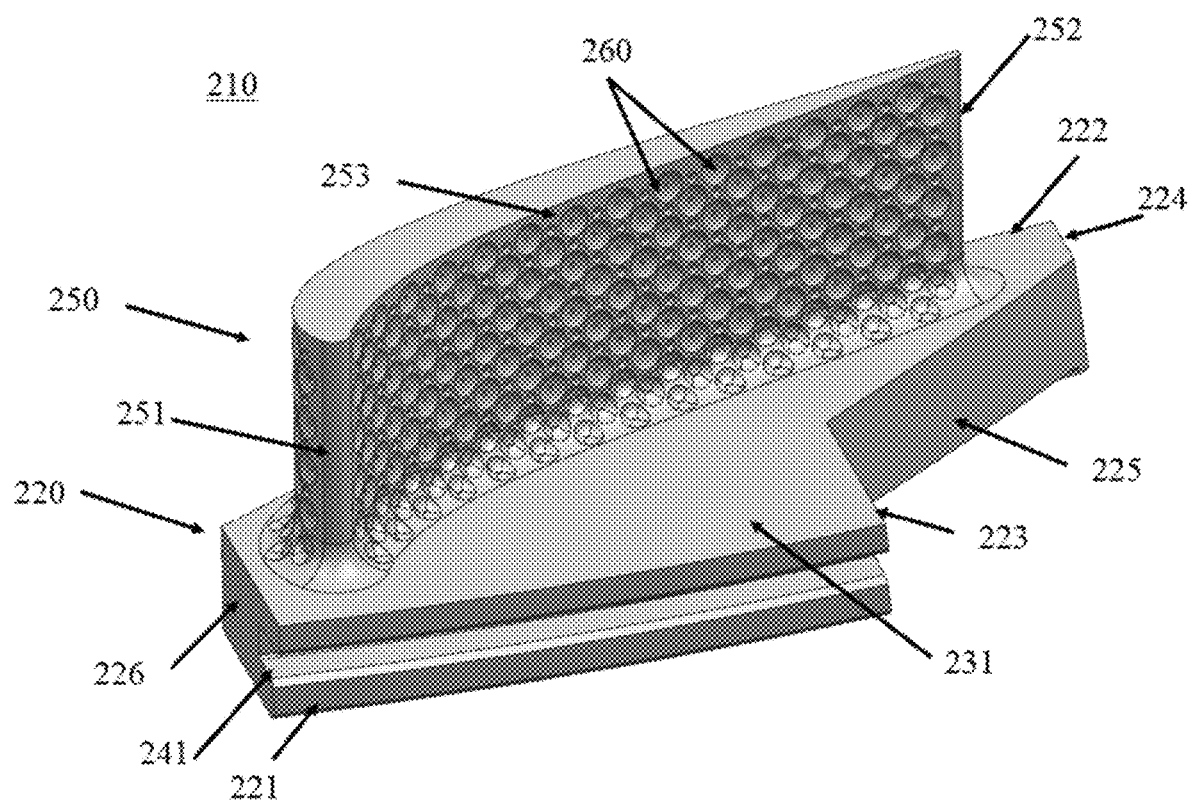
FIG. 3 shows a pre-swirler unit according to an embodiment of the subject invention.
Figure 4:
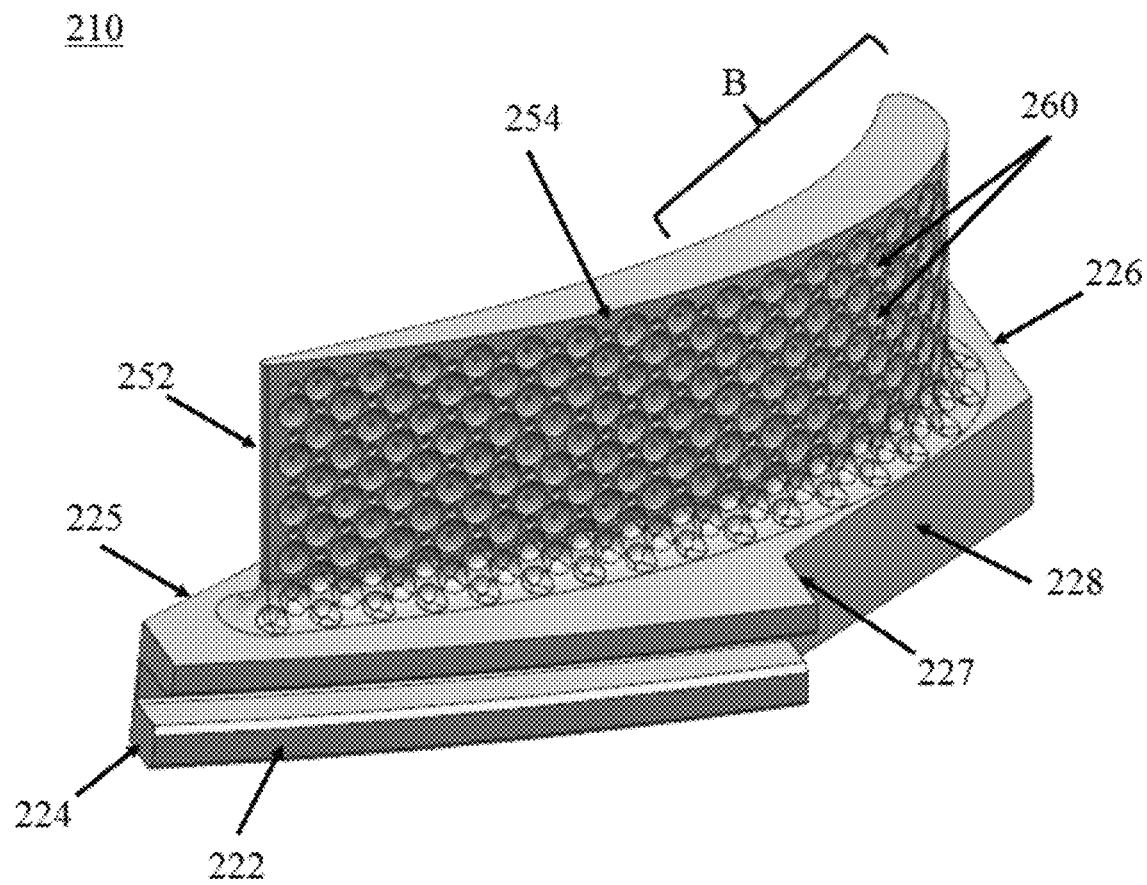
FIG. 4 shows a pre-swirler unit according to an embodiment of the subject invention.

FIGS. 3 and 4 show a pre-swirler unit according to an embodiment of the subject invention. Referring to FIGS. 1-4, the pre-swirler 200 comprises a plurality of pre-swirler units 210, and the plurality of pre-swirler units 210 are assembled with each other such that the pre-swirler 200 has a circular shape.

Each pre-swirler unit 210 comprises a shroud 220 and a blade 250 disposed on the shroud 220. The shroud 220 includes a bottom surface 232, a top surface 231, and a side surface between the bottom surface 232 and the top surface 231, and the blade 250 is disposed on the top surface 231. The side surface of the shroud 220 can include, but is not limited to, a first side surface 221, a second side surface 222, a third side surface 223, a fourth side surface 224, a fifth side surface 225, a sixth side surface 226, a seventh side surface 227, and an eighth side surface 228.

The first side surface 221 is located to correspond to a concave side surface 253 of the blade 250 and the second side surface 222 is located to correspond to a convex side surface 254 of the blade 250. The first side surface 221 and the second side surface 222 are configured to be in parallel with each other.

The third side surface 223 extends from the first side surface 221 toward the second side surface 222, and the fourth side surface 224 extends from the second side surface 222 toward the first side surface 221. The fifth side surface 225 is configured to connect the third side surface 223 to the fourth side surface 224 and corresponds to the concave side surface 253.

The sixth side surface 226 extends from the first side surface 221 toward the second side surface 222, and the seventh side surface 227 extends from the second side surface 222 toward the first side surface 221. The eighth side surface 228 is configured to connect the sixth side surface 226 to the seventh side surface 227 and corresponds to the convex side surface 254.

The third side surface 223 is in parallel with the sixth side surface 226, the fourth side surface 224 is parallel with the seventh side surface 227, and the fifth side surface 225 is parallel with the eighth side surface 228; therefore the plurality of pre-swirler units 210 can be easily assembled with each other.

The shroud 220 further comprises a first groove 241 formed on the first side surface 221 and a second groove 242 formed on the second side surface 222. The first groove 241 extends from the third side surface 223 to the sixth side surface 226, and the second groove 242 extends from the fourth side surface 224 to the seventh side surface 227; thereby allowing each first groove 241 of the each pre-swirler unit 210 to be coupled to each other and allowing each second groove 242 of the each pre-swirler unit 210 to be coupled to each other.

The blade 250 comprises a leading edge 251, a trailing edge 252, the concave side surface 253, and the convex side surface 254. The concave side surface 253 and the convex side surface 254 are disposed between the leading edge 251 and the trailing edge 252, and the concave side surface 253 and the convex side surface 254 are located in opposite side. The concave side surface 253 is configured to face the first side surface 221, the third side surface 223, and the fifth side surface 225, and the convex side surface 254 is configured to face the second side surface 222, the sixth side surface 226, the seventh side surface 227, and the eighth side surface 228. The leading edge 251 corresponds to (or face) the first side surface 221, and the trailing edge 252 corresponds to (or face) the fourth side surface 224.

Referring to FIGS. 2-4, when two pre-swirler units are assembled with each other, the "B" area of the convex side surface 254 face the concave side surface 253 of the next pre-swirler unit, and the cooling air passes through between the "B" area of the convex side surface 254 and the concave side surface 253 of the next pre-swirler unit. A plurality of dimples 260 formed on the "B" area of the convex side surface 254 lowers drag force on the convex side surface 254. In addition, the concave side surface 253 can comprise the plurality of dimples 260, and the plurality of dimples 260 can be formed on the whole area of the convex side surface 254 and the concave side surface 253. The plurality of dimples 260 can be formed to be uniform. The plurality of dimples 260 can have same shapes or different shapes. When the plurality of dimples 260 have different shapes or different sizes, the plurality of dimples 260 can be arranged such that the density of the plurality of dimples 260 increases such that small dimples are arranged between large dimples.

Referring to FIGS. 1-4, when the plurality of pre-swirler units 210 are assembled to make the pre-swirler 200, each of the plurality of pre-swirler units 210 is arranged such that the blade 250 faces a center C of the pre-swirler 200 and the bottom surface 232 faces the outward in a Z direction. In addition, the first side surface 221 and the concave side surface 253 face the compressor 110 in an X direction, and the second side surface 222 and the convex side surface 254 face the turbine 120 in a Y direction.

The subject invention includes, but is not limited to, the following exemplified embodiments.

Embodiment 1

A pre-swirler unit, comprising:
a shroud;
a blade disposed on the shroud and including a leading edge and a trailing edge,
wherein the blade comprises a concave side surface and a convex side surface that are disposed between the leading edge and the trailing edge, and
wherein the convex side surface comprises a first plurality of dimples.

Embodiment 2

The pre-swirler unit according to embodiment 1, wherein the concave side surface comprises a second plurality of dimples.

Embodiment 3

The pre-swirler unit according to any of embodiments 1-2, wherein the shroud comprises a first side surface corresponding to the concave side surface of the blade and a second side surface corresponding to the convex side surface of the blade, the first side surface comprises a first groove, and the second side surface comprises a second groove.

Embodiment 4

The pre-swirler unit according to embodiment 3, wherein the shroud comprises a third side surface extending from the first side surface toward the second side surface, a fourth side surface extending from the second side surface toward the first side surface, and a fifth side surface connecting the third side surface to the fourth side surface, and wherein the fifth side surface corresponds to the concave side surface.

Embodiment 5

The pre-swirler unit according to any of embodiments 3-4, wherein the shroud comprises a sixth side surface extending from the first side surface toward the second side surface, a seventh side surface extending from the second side surface toward the first side surface, and an eighth side surface connecting the sixth side surface to the seventh side surface, and wherein the eighth side surface corresponds to the convex side surface.

Embodiment 6

The pre-swirler unit according to embodiment 5, wherein the first plurality of dimples are formed on the convex side surface corresponds to the eighth side surface.

Embodiment 7

A pre-swirler, comprising:
a plurality of pre-swirler units,
wherein each of the plurality of pre-swirler units is the pre-swirler unit according to any of embodiments 1-6, and
wherein the plurality of pre-swirler units are assembled such that the pre-swirler has a circular shape.

Embodiment 8

The pre-swirler according to embodiment 7, wherein each pre-swirler unit comprises a bottom surface and a top surface, wherein the blade is disposed on the top surface, and wherein the plurality of pre-swirler units are assembled such that the blade of the each pre-swirler unit is toward a center of the circular shape.

Embodiment 9

A gas turbine, comprising:
a compressor providing compressed air;
a combustor receiving the compressed air and producing combusted gas;
a turbine receiving the combusted gas from the combustor; and
the pre-swirler according to any of embodiments 7-8,
wherein the pre-swirler is disposed before the turbine relative to a direction of air flow.

Embodiment 10

The gas turbine according to embodiment 9, wherein the pre-swirler is disposed between the compressor and the turbine, and provides the turbine with the compressed air.

Embodiment 11

A pre-swirler unit, comprising:
a shroud including a bottom surface and a top surface opposite to the bottom surface;
a blade disposed on the top surface and including a leading edge and a trailing edge, wherein the blade comprises a concave side surface and a convex side surface that are disposed between the leading edge and the trailing edge,
wherein the convex side surface comprises a first plurality of dimples, and
wherein the concave side surface comprises a second plurality of dimples.

Embodiment 12

The pre-swirler unit according to embodiment 11, wherein the shroud comprises a first side surface corresponding to the concave side surface of the blade and a second side surface corresponding to the convex side surface of the blade, the first side surface comprises a first groove, and the second side surface comprises a second groove.

Embodiment 13

The pre-swirler unit according to embodiment 12, wherein the first side surface is in parallel with the second side surface.

Embodiment 14

The pre-swirler unit according to embodiment 13, wherein the shroud comprises a third side surface extending from the first side surface toward the second side surface, a fourth side surface extending from the second side surface toward the first side surface, and a fifth side surface connecting the third side surface to the fourth side surface, and wherein the fifth side surface corresponds to the concave side surface.

Embodiment 15

The pre-swirler unit according to any of embodiments 13-14, wherein the shroud comprises a sixth side surface extending from the first side surface toward the second side surface, a seventh side surface extending from the second side surface toward the first side surface, and an eighth side surface connecting the sixth side surface to the seventh side surface, and wherein the eighth side surface corresponds to the convex side surface.

Embodiment 16

The pre-swirler unit according to embodiment 15, wherein the first groove extends from the third side surface to the sixth side surface, and the second groove extends from the fourth side surface to the seventh side surface.

Embodiment 17

The pre-swirler unit according to any of embodiments 13-16, wherein the leading edge corresponds to first side surface, and the trailing edge corresponds to the fourth side surface.

Embodiment 18

A pre-swirler unit, comprising:
a shroud including a bottom surface, a top surface opposite to the bottom surface, and a side surface disposed between the bottom surface and the top surface;
a blade disposed on the top surface and including a leading edge, a trailing edge, a concave side surface, and a convex side surface,
wherein the concave side surface and a convex side surface are disposed between the leading edge and the trailing edge,
wherein the convex side surface comprises a first plurality of dimples,
wherein the concave side surface comprises a second plurality of dimples,
wherein the side surface of the shroud comprises a first side surface, a second side surface, a third side surface, a fourth side surface, a fifth side surface, a sixth side surface, a seventh side surface, and an eighth side surface,
wherein the first side surface corresponds to the concave side surface of the blade and the second side surface corresponds to the convex side surface of the blade,
wherein the third side surface, the fourth side surface, and the fifth side surface connect the first side surface to the second side surface while the fifth side surface corresponds to the concave side surface, and
wherein the sixth side surface, the seventh side surface, and the eighth side surface connect the first side surface to the second side surface while the eighth side surface corresponds to the convex side surface.

Embodiment 19

The pre-swirler unit according to embodiment 18, further comprising a first groove formed on the first side surface and a second groove formed on the second side surface.

Embodiment 20

The pre-swirler unit according to any of embodiments 18-19, wherein the first side surface is in parallel with the second side surface, the third side surface is in parallel with the sixth side surface, the fourth side surface is parallel with the seventh side surface, and the fifth side surface is parallel with the eighth side surface.

Embodiment 21

A gas turbine, comprising:
a compressor providing compressed air;
a combustor receiving the compressed air and producing combusted gas;
a turbine receiving the combusted gas from the combustor; and
a pre-swirler disposed between the compressor and the turbine, and provides the turbine with the compressed air,
wherein the pre-swirler comprises a plurality of pre-swirler units according to any of embodiments 18-20,

Embodiment 22

The gas turbine according to embodiment 22, wherein each of the plurality of pre-swirler unit is arranged such that the first side surface and the concave side surface face the compressor, and the second side surface and the convex side surface face the turbine.

Embodiment 23

The gas turbine according to any of embodiments 21-22, wherein each of the plurality of pre-swirler unit is arranged such that the pre-swirler has a circular shape.

Embodiment 24

The gas turbine according to embodiment 23, wherein the each of the pre-swirler units is arranged such that the blade faces a center of the circular shape.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A pre-swirler unit, comprising:
a shroud;
a blade disposed on the shroud and including a leading edge and a trailing edge,
wherein the blade comprises a concave side surface and a convex side surface that are disposed between the leading edge and the trailing edge,
wherein the convex side surface comprises a first plurality of dimples,
wherein a plurality of pre-swirler units are assembled with each other such that a plurality of shrouds have a circular shapes, and the first plurality of dimples formed on the convex side surface lowers drag force on the convex surface,
wherein a pre-swirler comprising the plurality of pre-swirler units assembled with each other is disposed before a first turbine blade of a turbine to provide a swirled compressed air provided by a compressor to the turbine, and an area of the convex side surface of the pre-swirler unit in which the first plurality of dimples are formed faces the concave side surface of adjacent pre-swirler unit when two pre-swirler units are assembled with each other, and the swirled compressed air passes through a gap between the area of the convex side surface and the concave side surface of the adjacent pre-swirler unit, and
wherein the shroud comprises a first side surface corresponding to the concave side surface of the blade and a second side surface corresponding to the convex side surface of the blade, and the first side surface and the concave side surface face the compressor, and the second side surface and the convex side surface face the turbine,
wherein the first side surface and the second side surface are configured to be in parallel with each other,
wherein the shroud comprises a third side surface extending from the first side surface toward the second side surface, a fourth surface extending from the second side surface toward the first side surface, and a fifth side surface connecting the third side surface to the fourth side surface, and wherein the fifth side surface corresponds to the concave side surface.

2. The pre-swirler unit according to claim 1, wherein the concave side surface comprises a second plurality of dimples.

3. The pre-swirler unit according to claim 2, wherein the first side surface comprises a first groove, and the second side surface comprises a second groove.

4. The pre-swirler unit according to claim 3, wherein the shroud comprises a sixth side surface extending from the first side surface toward the second side surface, a seventh side surface extending from the second side surface toward the first side surface, and an eight side surface connecting the sixth side surface to the seventh side surface, and wherein the eighth side surface corresponds to the convex side surface.

5. The pre-swirler unit according to claim 4, wherein the plurality of dimples are formed on the convex side surface corresponds to the eights side surface.

6. A pre-swirler, comprising g:
a plurality of pre-swirler units,
wherein each of the plurality of pre-swirler units is the pre-swirler unit according to claim 5, and
wherein the plurality of pre-swirler units are assembled such that the pre-swirler has a circular shape.

7. The pre-swirler according to claim 6, wherein each pre-swirler unit comprises a bottom surface and a top surface, wherein the blade is disposed on the top surface, and wherein the plurality of pre-swirler units are assembled such that the blade of the each pre-swirler unit is toward a center of the circular shape.

8. A gas turbine, comprising:
a compressor providing compressed air;
a combustor receiving the compressed air and producing combusted gas;
a turbine receiving the combusted gas from the combustor; and
the pre-swirler according to claim 7;
wherein the pre-swirler is disposed before the turbine relative to a direction of air flow.

9. The gas turbine according to claim 8, wherein the pre-swirler is disposed between the compressor and the turbine, and provides the turbine with the compressed air.

10. A pre-swirler unit, comprising:
a shroud including a bottom surface and a top surface opposite to the bottom surface;
a blade disposed on the top surface and including a leading edge and a trailing edge, wherein the blade comprises a concave side surface and convex side surface that are disposed between the leading edge and the trailing edge,
wherein the convex side surface comprises a first plurality of dimples,
wherein the concave side surface comprise a second plurality of dimples,
wherein a plurality of pre-swirler units are assembled with each other such that a plurality of shrouds have a circular shape, the first plurality of dimples formed on the convex side surface lowers drag force on the convex surface, and the second plurality of dimples formed on the concave side surface lowers drag force on the concave surface,
wherein a pre-swirler comprising the plurality of pre-swirler units assembled with each other is disposed before a first turbine blade of a turbine to provide a swirled compressed air provided by a compressor to the turbine, and an area of the convex side surface of the pre-swirler unit in which the first plurality of dimples are formed faces the concave side surface of adjacent pre-swirler unit when two pre-swirler units are assembled with each other, and the swirled compressed air passes through a gap between the area of the convex side surface and the concave side surface of the adjacent pre-swirler unit, and wherein the shroud comprise a first side surface corresponding to the concave side surface of the blade and s second side surface corresponding to the convex side surface of the blade, and the first side surface and the concave side surface face the compressor, and the second side surface and the convex side surface face the turbine, wherein the first side surface and the second side surface are configured to be in parallel with each other, wherein the shroud comprises a third side surface extending from the first side surface toward the second side surface, a fourth side surface extending from the second side surface toward the first side surface, and a fifth side surface connecting the third side surface to the fourth side surface, and wherein the fifth side surface corresponds to the concave side surface.

11. The pre-swirler unit according to claim 10, wherein the first side surface comprises a first groove, and the second side surface comprises a second groove.

12. The pre-swirler unit according to claim 11, wherein the shroud comprises a sixth side surface extending from the first side surface toward the second side surface, a seventh side surface extending from the second side surface toward the first side surface, and an eight side surface connecting the sixth side surface to the seventh side surface, and wherein the eight side surface corresponds to the convex side surface.

13. The pre-swrler unit according to claim 12, wherein the first groove extends from the third side surface to the sixth side surface, and the second groove extends from the fourth side surface to the seventh side surface.

14. The pre-swirler unit according to claim 12, wherein the leading edge corresponds to first side surface, and the trailing edge corresponds to the fourth side surface.

15. A pre-swirler unit, comprising:
a shroud including a bottom surface, a top surface opposite to the bottom surface, and a side surface disposed between the bottom surface and the top surface,
a blade disposed on the top surface and including a leading edge, a trailing edge, a concave side surface, and a convex side surface,
wherein the concave side surface and convex side surface are disposed between the leading edge and the trailing edge,
wherein the convex side surface comprises a first plurality of dimples,
wherein the concave side surface comprises a second plurality of dimples,
wherein the side surface of the shroud comprises a first side surface, a second side surface, a third side surface, a fourth side surface, a fifth side surface, a sixth side surface, a seventh side surface, and an eight side surface,
wherein the first side surface corresponds to the concave side surface of the blade and the second side surface corresponds to the convex side surface of the blade, and the first side surface and the concave side surface face a compressor, and the second side surface and the convex side surface face a turbine,
wherein the sixth side surface, the seventh side surface, and the eight side surface connect the first side surface to the second side surface while the eighth side surface corresponds to the convex side surface, and
wherein a plurality of pre-swirler units are assembled with each other such that a plurality of shrouds have a circular shape, the first plurality of dimples formed on the convex side surface lowers drag force on the convex surface, and the second plurality of dimples formed on the concave side surface lowers drag force on the concave surface, and
wherein a pre-swirler comprising the plurality of pre-swirler units assembled with each other is disposed before a first turbine blade of the turbine to provide a swirled compressed air provided by the compressor to the turbine, and an area of the convex side surface of the pre-swirler unit in which the first plurality of dimples are formed faces the concave side surface of adjacent pre-swirler unit when two pre-swirler units are assembled with each other, and the swirled compressed air passes through a gap between the area of the convex side surface and the concave side surface of the adjacent pre-swirler unit,
wherein the first side surface and the second side surface are configured to be in parallel with each other,
wherein the shroud comprises a third side surface extending from the first side surface toward the second side surface, a fourth side surface extending from the second side surface toward the first side surface, and the fifth side surface connecting the third side surface to the fourth side surface, and wherein the fifth side surface corresponds to the concave side surface.

16. The pre-swirler unit according to claim 15, further comprising a first groove formed on the first side surface and a second groove formed on the second side surface.

17. The pre-swirler unit according to claim 15, wherein the first side surface corresponds to the leading edge and the fourth side surface corresponds to the trailing edge.

* * * * *